W. L. PATTERSON.
HOLDER FOR PROJECTION APPARATUS.
APPLICATION FILED AUG. 30, 1912.
1,146,948.
Patented July 20, 1915.
2 SHEETS—SHEET 1.
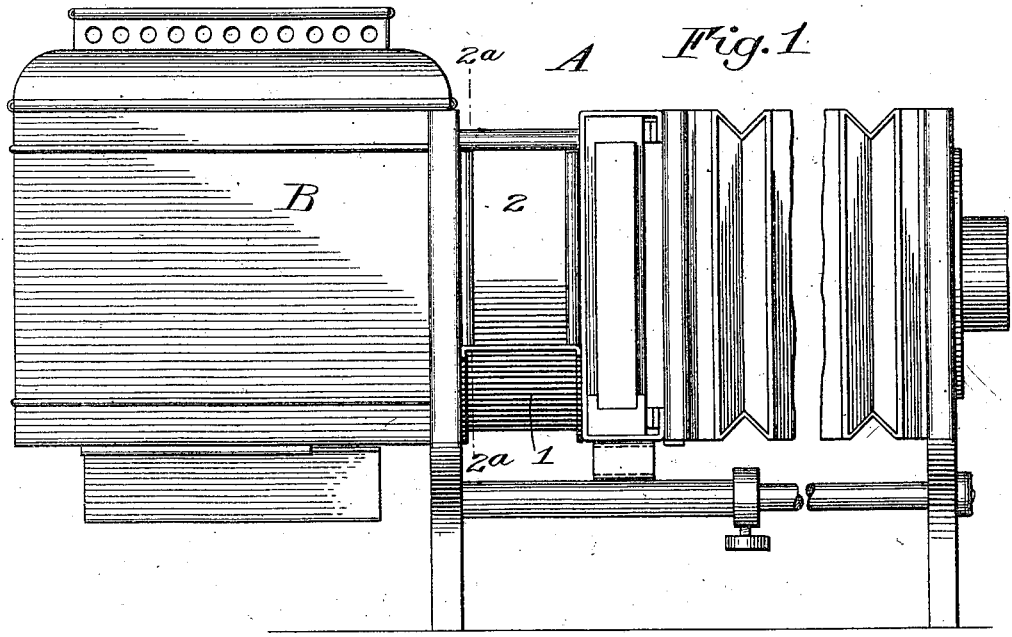
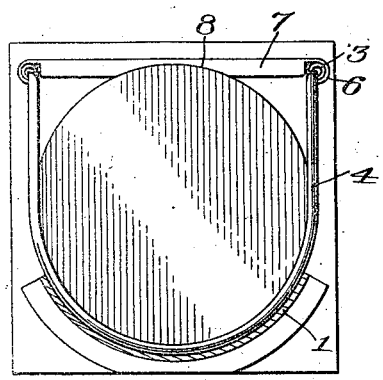
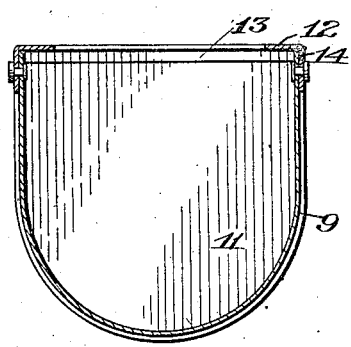
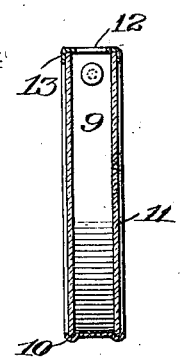
Witnesses
Walter B. Payne
H. E. Stonebraker
Inventor
William L. Patterson
By
his Attorneys

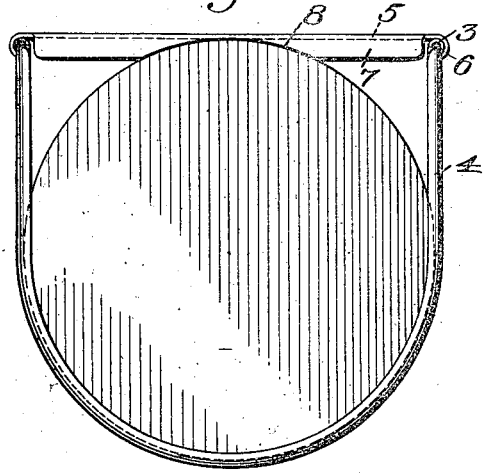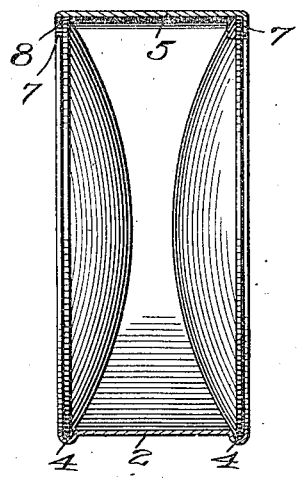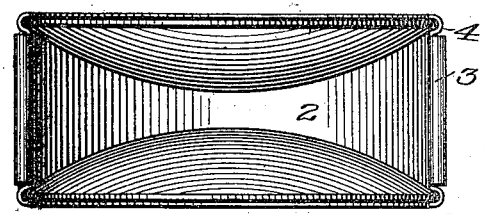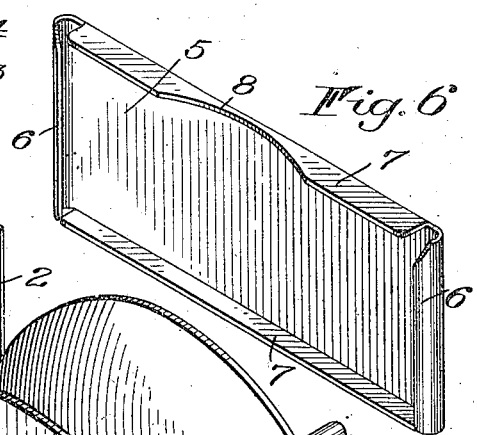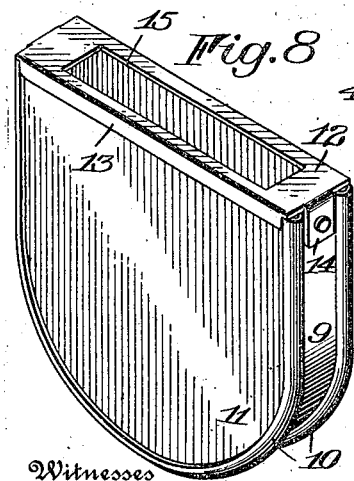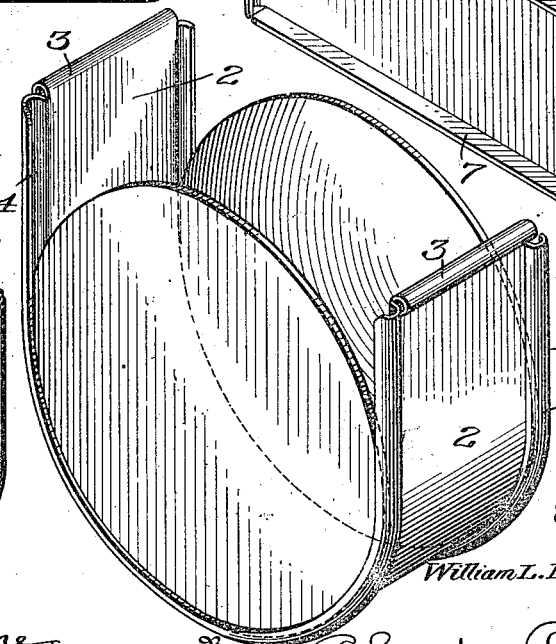

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

HOLDER FOR PROJECTION APPARATUS.

1,146,948.      Specification of Letters Patent.      Patented July 20, 1915.

Application filed August 30, 1912. Serial No. 717,849.

*To all whom it may concern:*

Be it known that I, WILLIAM L. PATTERSON, of Rochester, in the county of Monroe and State of New York, have invented certain new and useful Improvements in Holders for Projection Apparatus; and I do hereby declare the following to be a full, clear, and exact description of the same, reference being had to the accompanying drawings, forming a part of this specification, and to the reference-numerals marked thereon.

The present invention relates to holders for projection apparatus, with particular reference to means for retaining the elements of a system of lenses, and it has for its object to provide a device that is both inexpensive and easy to manufacture, and in which the lenses can quickly be positioned.

A further object of the invention is to provide a structure that permits a lens or similar plate to be held securely in its proper position in the holder, and to be readily removed when desired.

To these and other ends the invention consists in certain improvements and combinations of parts, all as will be hereinafter more fully described, the novel features being pointed out in the claims at the end of the specification.

In the drawings: Figure 1 is a side elevation, partly broken away, of a projection apparatus showing the application of a preferred embodiment of my invention; Fig. 2 is a sectional view on the line 2ª—2ª of Fig. 1; Fig. 3 is a front elevation of the holder; Fig. 4 is a vertical sectional view showing a pair of lenses held thereby; Fig. 5 is a plan view with the cover removed; Fig. 6 is a perspective view of the cover; Fig. 7 is a perspective view with the cover removed; Fig. 8 is a perspective view of a modified form of the invention showing its application to a water container or cooling chamber for projection apparatus; Fig. 9 is a vertical sectional view taken longitudinally of the structure shown in Fig. 8, and Fig. 10 is a transverse vertical sectional view.

Similar reference numerals throughout the several figures indicate the same parts.

The device shown in the preferred embodiment of my invention, as illustrated in Figs. 1 to 7 inclusive, is adapted for supporting the condensing lenses of a projection apparatus which is designated generally at A. Arranged immediately in front of the illuminator B is a stationary support 1 which is curved, as shown in Figs. 1 and 2, and adapted to receive the bottom of the holder, the latter having a corresponding curvature to fit the support.

The holder consists, preferably, of a U-shaped strip of resilient material, such as sheet metal 2, the ends being rolled or turned to form enlargements 3 for a purpose that will presently appear. Extending longitudinally of the strip 2 and preferably adjacent to its edges, are the grooves 4 which are stamped or pressed in the metal and preferably extend throughout the length of the strip 2, these being adapted to receive the lenses, the curved edges of which engage the rounded lower portions of the grooves.

The cover is designated at 5, and preferably consists of a rectangular flat portion having curved flanges 6 at its ends arranged to engage the enlargements 3 on the strip 2. The cover is also provided with side flanges 7, a cut away portion 8 being afforded in one of said flanges so as to permit the cover to be pushed on without obstruction by the upper portions of the lenses, as shown in Fig. 3. The cover, when in engagement with the enlargements 3, prevents spreading of the upper portions of the U-shaped strip 2. The lenses are thus held tightly in engagement with the retaining grooves, and cannot be displaced until the cover is removed.

It will be obvious that my invention is not limited in its application to the holding of lenses as described, and in Figs. 8 and 10, inclusive, I have shown a modification which is designed for holding glass plates of slightly different form, to afford a water container or cooling chamber, such as may be employed in connection with projection apparatus. In this form, 9 designates the sheet metal strip which is grooved at 10, and 11 are glass plates which conform substantially to the shape of the U-shaped strip 9.

12 is a cover having side flanges 13 and lugs 14 at its ends, these being attached to the strip 9 in any suitable manner. The cover is provided with a longitudinal central opening 15, by which it may be filled and emptied when desired.

The glass plates 11 may be cemented or otherwise firmly attached to the strip 9 to prevent leakage, when the device is employed as a cooling chamber.

Further modifications and departures from the present disclosure may be had, that come within the scope and purview of my improvement, and it is my purpose to cover by this application any structure of this general type embodying a U-shaped strip having grooves stamped therein to receive plates, and a cover coöperating with the ends of the U-shaped strip.

I claim as my invention:

1. In combination with a U-shaped strip of resilient metal having a groove extending lengthwise thereof to receive a sheet of material such as a lens, of a cover provided with flanges at its ends, and enlargements at the ends of said strip arranged for engagement with the flanges on the cover.

2. A U-shaped holder provided with a groove throughout its length to receive a body having a narrow curved edge with which the bottom of the holder coöperates, the end portions of the holder extending in parallelism to each other to a point substantially flush with the outer edge of the body to afford a housing for said body.

3. A holder comprising a U-shaped strip of resilient metal having grooves formed adjacent to its edges to receive bodies having narrow curved edges such as lenses, the end portions of the holder extending in parallelism to each other to a point substantially flush with the outer edge of the body to afford a housing for said bodies.

4. The combination with a U-shaped strip of resilient metal having grooves formed adjacent to its edges and extending lengthwise thereof to receive bodies having narrow curved edges such as lenses, of a cover, the end portions of said strip of metal extending in parallelism to each other to a point substantially flush with the outer edge of the body to afford a housing for the bodies, said cover coöperating with the ends of the strip and adapted to be attached thereto.

WILLIAM L. PATTERSON.

Witnesses:
 WILLIAM G. WOODWORTH,
 DANIEL M. SMITH.